United States Patent

[11] 3,615,928

[72] Inventors John W. Wagner
Diamond Bar;
Robert K. Willardson, Arcadia, both of Calif.
[21] Appl. No. 864,721
[22] Filed Oct. 8, 1969
[45] Patented Oct. 26, 1971
[73] Assignee The United States of America as represented by the Secretary of the Navy

[54] GROWTH OF $Pb_{1-x}Sn_xTe$ FROM NONSTOICHIOMETRIC MELTS
5 Claims, 6 Drawing Figs.

[52] U.S. Cl. .......... 148/172, 23/204, 148/1.6, 148/171, 148/173, 252/62.3
[51] Int. Cl. .......... H01l 7/40, B01j 17/00
[50] Field of Search .......... 148/1.5, 1.6, 171–173; 252/62.3; 23/204, 301; 136/89

[56] References Cited
UNITED STATES PATENTS

| | | | |
|---|---|---|---|
| 3,045,057 | 7/1962 | Cornish .......... | 252/62.3 X |
| 3,403,133 | 9/1968 | Fredrick et al. .......... | 252/62.3 |

OTHER REFERENCES

Hiscocks et al., " Crystal Pulling and Constitution in Pb Sm Te" J. Materials Science, Vol. 3, 1968, pp. 76–79.

*Primary Examiner*—L. Dewayne Rutledge
*Assistant Examiner*—W. G. Saba
*Attorneys*—E. J. Brower and J. M. St. Amand

ABSTRACT: Single crystals of $Pb_{1-x}Sn_xTe$ grown from nonstoichiometric, cation-rich melts; the as-grown, bulk material containing carrier concentrations ranging from $10^{16}/cm.^3$ to $10^{20}/cm^3$.

JOHN W. WAGNER
ROBERT K. WILLARDSON
*INVENTORS*

BY J. M. St. Amand

*ATTORNEY*

JOHN W. WAGNER
ROBERT K. WILLARDSON
INVENTORS

BY J. M. St. Amand
ATTORNEY

GROWTH OF $Pb_{1-x}Sn_xTe$ FROM NONSTOICHIOMETRIC MELTS

The invention herein described may be manufactured and used by or for the Government of the United States of America for governmental purposes without the payment of any royalties thereon or therefor.

This invention is in the field of semiconductors and is related to the production of semiconductor materials containing low carrier concentrations.

Bulk single crystals of $Pb_{1-x}Sn_xTe$ have previously been grown from stoichiometric melts. Such crystals are p-type and have relatively high carrier concentrations ranging from $\sim 9 \times 10^{18}/cm^3$ for PbTe to $\sim 8 \times 10^{20}/cm^3$ for SnTe at 77° K. These carrier concentrations result from deviations from stoichiometry (lead vacancies) in the as-grown crystals. Since lower carrier concentrations are desirable for electro-optic device applications, it is necessary to subject these crystals to long-term isothermal anneals.

A basic problem in the production of melt-grown $Pb_{1-x}Sn_xTe$ materials for semiconductor device applications has been the high defect concentration present in the material produced. This defect concentration is due to the solidification of $Pb_{1-x}Sn_xTe$ with an excess of tellurium (or deficiency of lead-tin). Previous attempts to eliminate these defects have involved the annealing over long periods of time of the $Pb_{1-x}SnTe$ materials in the presence of cation-rich vapors under isothermal conditions. Since the annealing procedure requires from 2 weeks to 3 months and since only limited quantities can be simultaneously annealed, new and improved techniques for obtaining low defect concentration material have been desired.

The present invention for growth of $Pb_{1-x}Sn_xTe$ from nonstoichiometric melts can produce near-stoichiometric materials containing low carrier (defect) concentrations. This technique completely eliminates the previously required annealing procedures. The present technique saves considerable time and labor and also produces materials with significantly improved electrical properties.

This invention involves the solidification of $Pb_{1-x}Sn_xTe$ materials from cation-rich (Te-deficient) solutions. The principle employed is based upon the ternary phase diagram for Pb-Sn-Te which reveals that $Pb_{1-x}Sn_xTe$ materials solidifying from Pb-Sn rich solutions will be much closer to stoichiometry than materials solidifying from a stoichiometric melt. FIG) 1 is a plot of the carrier concentrations (in this case a measure of stoichiometric deviations) of as-solidified $Pb_{1-x}Sn_xTe$ materials as a function of the tellurium percentage in the solutions. It can be seen that the materials grown from melts containing 50 percent tellurium have much higher carrier concentrations (stoichiometric deviations) than those materials grown from solutions containing lower tellurium concentrations.

This invention is useful for preparing bulk materials from solution and also for growing epitaxial layers of $Pb_{1-x}Sn_xTe$ on substrates from very cation-rich solutions. The latter materials being of very high perfection should be quite useful for device applications in the $Pb_{1-x}Sn_xTe$ field.

Other objects and many of the attendant advantages of this invention will become readily appreciated as the same becomes better understood by reference to the following detailed description when considered in connection with the accompanying drawings wherein.

This invention is for the growth of $Pb_{11x}Sn_xTe$ single crystals from nonstoichiometric melts with the primary objective of producing as-grown material containing relatively low ($10^{16}$–$10^{18}/cm.^3$) carrier concentrations and the general characteristics of these crystals is given herein.

Figures 2, 3:
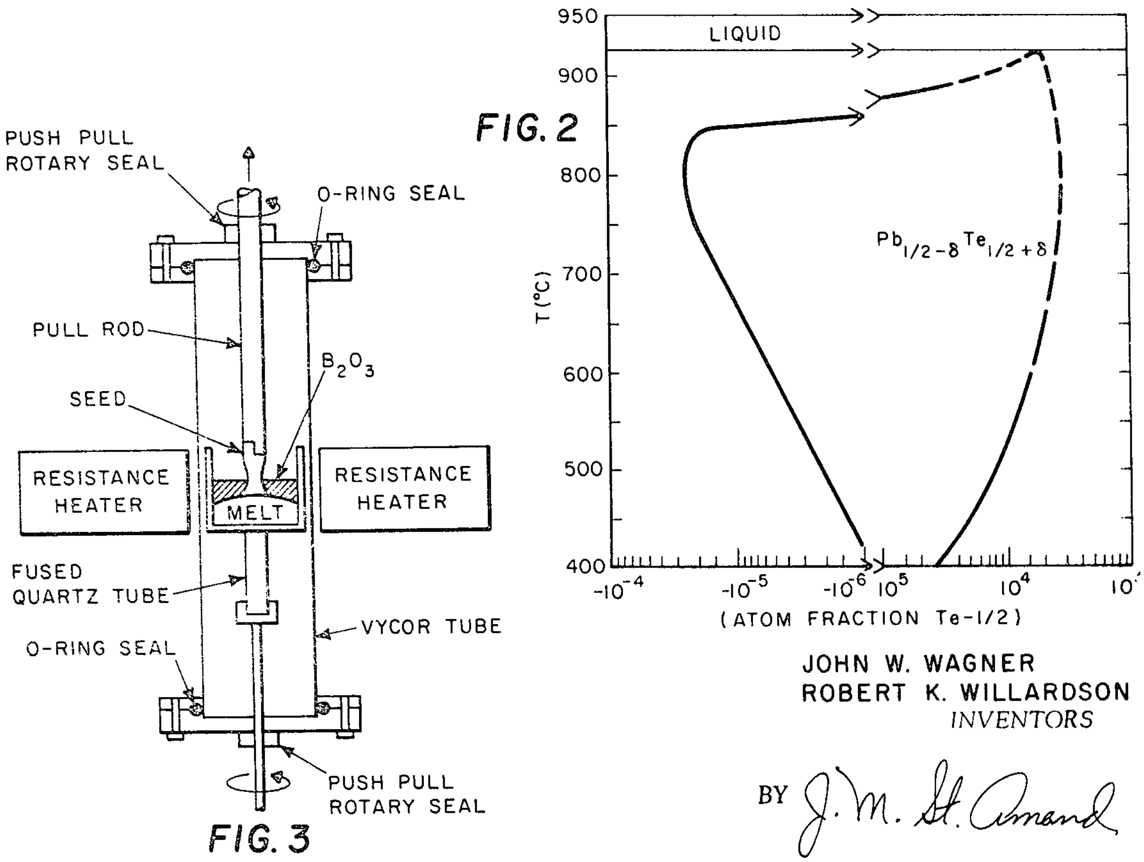
FIG. 2 is a T-$x$ diagram for PbTe near the stoichiometric composition.
FIG. 3 is a schematic diagram of the growth apparatus.

The phase relationships in $Pb_{1-x}Sn_xTe$ systems are such that materials solidifying from nonstoichiometric, cation-rich melts will have smaller deviations from stoichiometry than materials grown from stoichiometric melts. FIG. 2 is the T-$x$ phase diagram for PbTe in the vicinity of the stoichiometric composition. From the diagram of FIG. 2 one can see that a crystal grown from a stoichiometric melt will contain 50.01 percent tellurium. PbTe single crystals actually grown from stoichiometric melts have carrier concentrations of $9 \times 10^{18}/cm.^3$, indicating that the excess tellurium in the crystals is about a factor of two greater than expected from this phase diagram. However, growth of PbTe from a lead-rich melt results in material having a more nearly stoichiometric composition. Although the addition of Sn to the melt shifts the solidus curve further towards the tellurium-rich side, the general discussion given herein for PbTe apples to the $Pb_{1-x}Sn_xTe$ systems as well.

Single crystals of $Pb_{1-x}Sn_xTe$ have been grown from nonstoichiometric, cation-rich melts using the Czochralski technique and boric oxide liquid encapsulation. In the present study, three specific crystal compositions were investigated in detail; $x$=0.00, 0.10, and 0.17.

A schematic diagram of the growth apparatus is shown in FIG. 3. The Vycor tube is sealed at both ends by O-ring flanges so that a vacuum or a positive pressure may be maintained in the growth chamber. The pull rod and crucible may be rotated; all crystals produced in this study were grown with the crucible stationary. Heating was by resistance furnace, and the temperature was sensed by a thermocouple. The growth apparatus is quite simple, but adequate.

In order to contain the volatile components and thus maintain stoichiometric conditions, the liquid encapsulation technique was used. By covering the melt with liquid boric oxide ($B_2O_3$) and maintaining on the outer surface of the liquid an inert gas pressure, which was greater than the vapor pressure of the most volatile component, volatilization was suppressed. Boric oxide was chosen because it: (1) was less dense than the melt; (2) was optically transparent; and (3)did not react with the melt in any manner. The seed was lowered through the boric oxide to the melt surface and the crystal was slowly pulled through the $B_2O_3$. Often the boric oxide was so viscous that a thin layer remained on the crystal as it was pulled from the melt.

Growth of alloy crystals from nonstoichiometric melts requires considerable care, and good quality single crystals are obtained by optimizing the mechanical and thermal stability of the growth system and by using pull rates of from 1 to 3 millimeters per hour. The liquid encapsulation technique has been found to yield near-ideal conditions, since the $B_2O_3$ layer increases the thermal stability at the growth interface, permits easy attainment of near-ideal thermal gradients, and dampens vibrations at the melt surface. The hygroscopic character of the $B_2O_3$ can cause a slight problem and vacuum heat treating is necessary to completely remove the water from the boric oxide.

During initial growth, the seed diameter was reduced and a narrow neck of1–2 mm. diameter and of several millimeters length was grown. The latter steps are necessary for the growth of single crystals; if either of these two requirements are not fulfilled, small angle boundaries will be present in the ingot.

Growth from melts containing 30–35 percent tellurium yield polyphase material if pull rates of greater than 2 mm./hr. are used. However, single crystals can be successfully grown from melts containing as little as 10 percent tellurium by using a 0.2 mm./hr. pull rate.

Single crystals of high quality can also be grown from solutions containing less than 10 percent tellurium using such solution growth techniques as the steady-state thermal gradient technique (S. B. Austerman, et al.: Carbon, 1967, vol. 5, pp. 549–557) and the liquid epitaxy technique (H. Olsen, et al.; J. Electrochem Soc., 1967, vol. 114, p. 64C). Such techniques are capable of exceptionally slow growth rates, i.e., less than 1 mm./day.

Typical single crystals produced by the present invention were grown from melts of approximately 350 grams and weighed 10–20 grams. The crystals were 5 to 10 millimeters in diameter and 2 to 3 centimeters in length. Attempts to grow larger diameter crystals usually resulted in polycrystalline materials.

Measurements have been made of the Hall coefficients and electrical conductivities of the ingots using conventional DC potentiometric techniques. Carrier mobilities ($R\sigma$) and carrier concentrations ($p=1/eR_{77^\circ K}$) were then determined. The relationship between the composition of the melt and the carrier concentration in the as-grown crystal was studied in detail for three crystal compositions of interest. The electrical properties reported for these materials are for the first-to-freeze portion of each ingot. However, since large melts (~350 grams) were used and crystals of 10–20 grams weight were grown, the carrier concentrations did not change drastically along the lengths of the crystals. For crystals in which the carrier concentration at the top was greater than $4\times10^{17}$/cm.$^3$, the largest difference in carrier concentration between the top and bottom of a crystal was not more than a factor of two.

X-ray powder photographs were made of sections of several ingots to verify the alloy composition (using Vegard's law) and to determine whether the materials were single phase. Using proper sample preparations, sharp lines were generally seen in the powder photographs and the $\alpha_1$–$\alpha_2$ doublets were resolved in the high-angle back-reflection region. This indicates a relatively homogeneous single-phase material which is essentially free of strains. Laue photographs were made for single crystal verification and for a qualitative indication of crystal perfection.

(S. E. R. Hiscocks and P. D. West: J. Mat. Sci., 1968, vol. 3, pp. 76–79) have reported the occurrence of constitutional supercooling (resulting in metallic inclusions) in the growth of $Pb_{1-x}SnTe$ crystals which were rapidly pulled from near-stoichiometric melts. (J. F. Butler and T. C. Harman: J. Electrochem Soc., 1968, vol. 115, p.67C) have also reported the existence of metallic inclusions in $Pb_{1-x}S_xTe$ crystals grown by the Bridgeman technique from stoichiometric charges. In addition, small-angle grain boundaries have been frequently seen in $Pb_{1-x}Sn_xTe$ ingots grown by both the Czochralski and Bridgeman techniques. Therefore, sections from each ingot grown by this invention were polished and etched using an electrolytic technique developed by (M. K. Norr: NOLTR 63–156U.S. Naval Ordnance Laboratory, White Oak, Md.) and were metallographically examined to determine the existence of low-angle grain boundaries and cell structure (metallic inclusions). Material found to contain low-angle grain boundaries was always classified as polycrystalline. For the slow pull speeds (≤3 mm./hr.) used in this invention, cell structure was not evident in ingots grown from melts containing more than 30 percent tellurium.

Crystal Growth

Single crystals of lead telluride have been grown from melts containing from 50 percent to as little as 39 percent tellurium. These crystals were all pulled at 3 mm./hr. with a seed rotation of 6 r.p.m. The top (first-to-freeze) sections of the crystals were found to contain about $5\times10^5$ dislocations per square centimeter and were free of low-angle grain boundaries. The base portion of each ingot generally contained several low-angle boundaries. All of the ingots were found to be free of cell structure or metallic inclusions.

Single crystals of $Pb_{0.90}Sn_{0.10}Te$ were grown from melts of $(Pb_{0.84}Sn_{0.16})_{1-y}Te_y$ with y ranging from 0.50 to 0.30. Crystals which were grown from near-stoichiometric melts were easily pulled at 3 mm./hr., while crystals grown from melts containing low tellurium concentrations (<45 percent) had to be pulled at 1–2 mm./hr. As in the case of PbTe, the first-to-freeze sections of the ingots were single, while the lower portions contained low-angle boundaries. The single crystals nominally contained $10^6$ dislocations per square centimeter. All of the ingots were electrolytically polished and were found to be free of cell structure.

Single crystals of $Pb_{0.83}Sn_{0.17}Te$ were grown from melts of $(Pb_{0.745}Sn_{0.255})_{1-y}Te_y$ where y=0.50 and 0.40, and 0.30. An ingot grown at a pull speed of 1 cm./hr. from a melt containing 35 percent tellurium was polyphase material. Such polyphase material was easily identified using the electrolytic polish and the X-ray powder photographs.

Electrical Properties

Both N- and P-type PbTe single crystals were obtained, N-type material being grown from melts containing less than 40.2 percent tellurium. The carrier concentrations and carrier mobilities of the first-to-freeze sections of the lead telluride crystals are listed in table I.

TABLE I

Electrical properties of $Pb_{1-x}Sn_xTe$ crystals grown from non-stoichiometric melts

| Percent Te in Melt | X | $P_{77^\circ K}$ (cm − 3) | $\mu_{77^\circ K}$ (cm$^2$/V-sec) |
|---|---|---|---|
| 50 | 0.00 | 9.1 (× $10^{18}$) | 8,000 |
| 45 | 0.00 | 5.7 | 11,000 |
| 42 | 0.00 | 1.1 | 26,000 |
| 41.5 | 0.00 | 0.40 | 25,000 |
| 40 | 0.00 | 0.004* | .................... |
| 39.0 | 0.00 | 0.38* | 12,000 |
| 38.6 | 0.00 | 1.5* | 22,000 |
| 50 | 0.10 | 48 | 710 |
| 45 | 0.10 | 22 | 1,400 |
| 41 | 0.10 | 11 | 4,400 |
| 35 | 0.10 | 3.7 | 5,500 |
| 30 | 0.10 | 1.5 | 9,000 |
| 50 | 0.17 | 92 | 470 |
| 40 | 0.17 | 21 | 500 |
| 30 | 0.17 | 7.7 | 4,500 |

* n-type.

Figure 4:
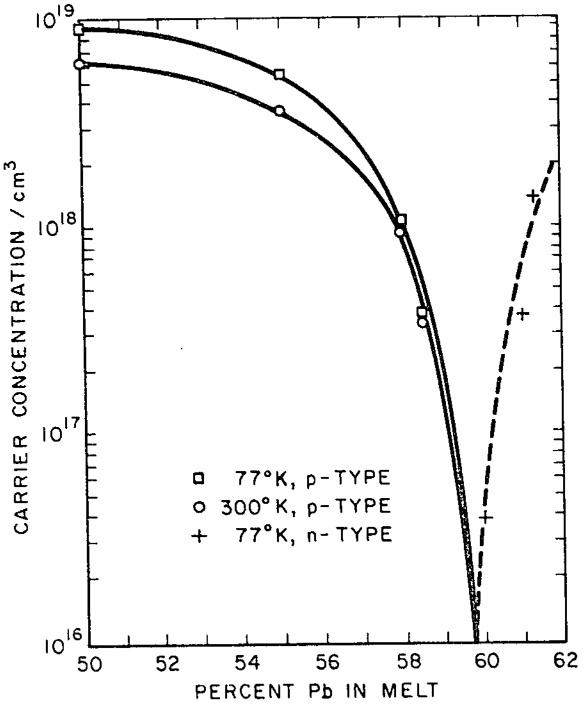
FIG. 4 shows carrier concentrations of PbTe single crystals as a function of melt composition.

For a melt containing 41.5 percent tellurium, P-type crystals were grown with a carrier concentration of $4\times10^{17}$/cm.$^3$ which is a factor of 20 less than the $9\times10^{18}$/cm.$^3$ which would have been obtained if the crystal were grown from a stoichiometric melt. This reduction in carrier concentration (or scattering centers) resulted in a mobility of 25,000 cm.$^2$/volt-sec. rather than the 8,000 cm.$^2$/volt-sec. normally found in pulled single crystal PbTe. The mobilities of the N-type PbTe samples containing $<5\times10^{17}$/carriers per cm.$^3$ are relatively low and these samples are believed to be compensated with $1-2\times10^{17}$ P-type impurities per cubic centimeter. FIG. 4 is a plot of carrier concentrations determined at 300° and 77° K. in the PbTe crystals as a function of the percentage of lead in the melts. As indicated by the steep slope of the curve in the range of 58–62 percent lead, the carrier concentrations of crystals grown from melts in this composition range will change rapidly with small changes in melt composition. However, since less than 5 percent of the melt was generally pulled, the percentage of lead in the melt changed by less than 0.5 percent as the crystal was grown.

Figure 5:
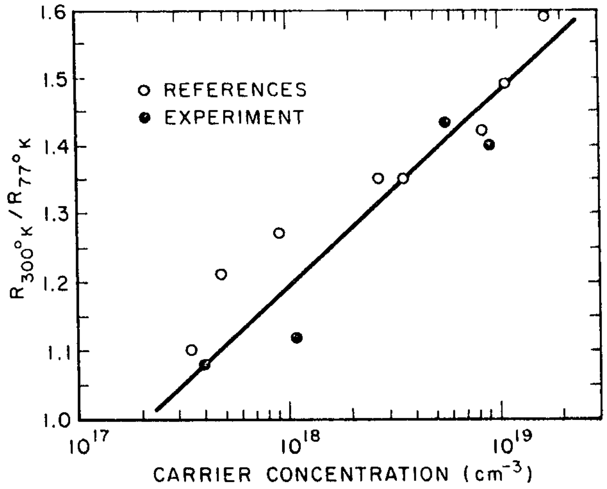
FIG. 5 shows the Hall ratios of PbTe crystals vs. carrier concentrations.

The difference between the apparent carrier concentrations ($p=1/Re$) determined at 300° and 77° K. is seen to decrease as the nominal carrier concentration ($p^*=1/R_{77^\circ K}e$) decreases. This is in agreement with (R. S. Allgaier: J. Appl. Phys., 1961, vol. 32, pp. 2185–2189) who has attributed this behavior to the presence of a second valence band which becomes appreciably populated at temperatures above 77° K. The Hall ratios ($R_{300^\circ K}/R_{77^\circ K}$) vs. carrier concentrations ($p^*=1/R_{77^\circ K}e$) for the lead telluride crystals are plotted in FIG. 5 along with data of Allgaier, and (R. S. Allgaier and B. B. Houston, Jr.: J. Appl. Phys., 1966, vol. 37, pp. 302–309). Hall coefficients were obtained using a field of 20,000 Gauss, while the data of Allgaier, and Allgaier and Houston utilized weak-field Hall coefficients.

Figure 1:
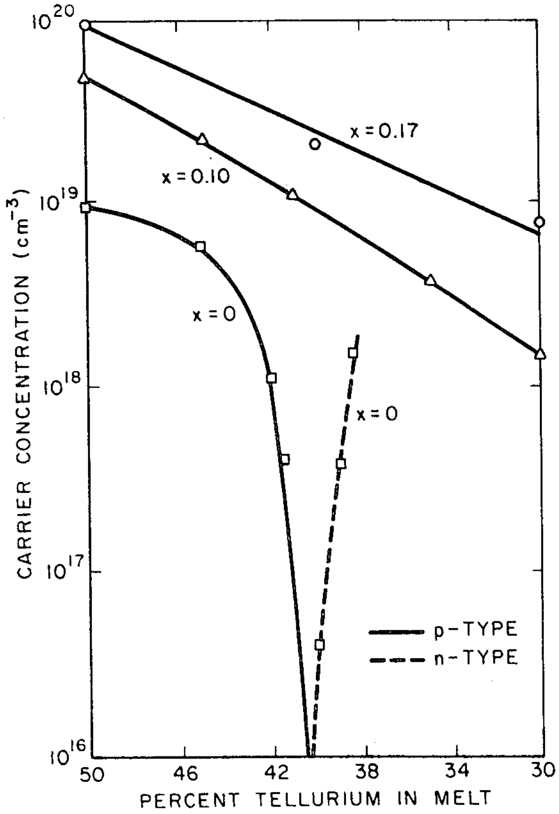
FIG. 1 is a plot of the carrier concentrations of as-solidified $Pb_{1-x}SnTe$ materials as a function of melt composition.

Only P-type single crystals of $Pb_{0.90}Sn_{0.10}Te$ and $Pb_{0.83}Sn_{0.17}Te$ were grown. The carrier concentrations and hole mobilities of these crystals are also listed in table I. Carrier concentrations in the $10^{18}$/cm.$^3$ range were achieved for both alloys. Hole mobilities of 9,000 cm.$^2$/volt-sec. for $Pb_{0.90}Sn_{0.10}Te$ and 4,500 cm.$^2$/volt-sec. for $Pb_{0.83}Sn_{0.17}Te$ were obtained at 77° K. FIG. 1 is a plot of the carrier concentrations at 77° K. in the $Pb_{1-x}SnTe$ crystals vs. the tellurium percentage in the melts. The results of experiments indicate that $Pb_{1-x}Sn_xTe$ materials having $x \geq 0.10$ and having carrier concentrations of less than $10^{18}$/cm.$^3$ are very difficult to pull from nonstoichiometric melts. However, solution-growth techniques which incorporate very low growth rates permit $Pb_{1-x}Sn_xTe$ materials with low ($10^{18}$/cm.$^3$) carrier concentrations to be grown from solutions containing less than 10 percent Te.

Figure 6:
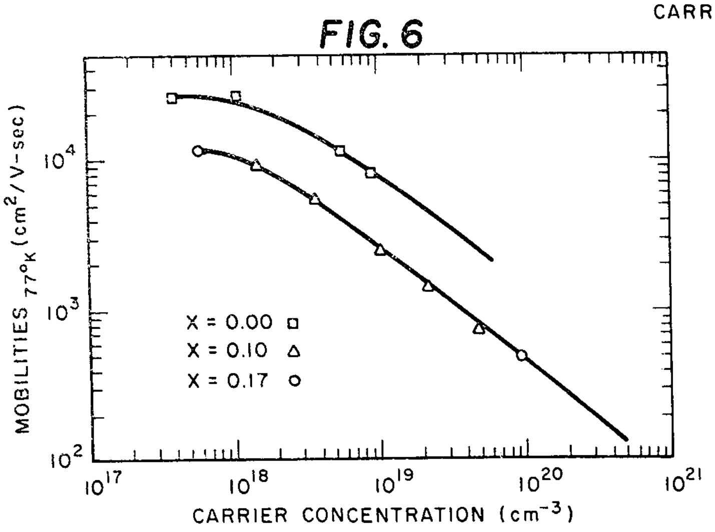
FIG. 6 is a plot of carrier mobilities of P-type $Pb_{1-x}Sn_xTe$ crystals.

The hole mobilities determined at 77° K. for the single crystals grown in this study are plotted in FIG. 6 as a function of carrier concentration.

Single crystals of undoped $Pb_{1-x}Sn_xTe$ where $x$=0.10 and 0.17 have been grown from nonstoichiometric melts with carrier concentrations in the $10^{18}$ region and with higher mobilities than similar materials grown from stoichiometric melts. Solution growth techniques from solutions containing much less than 30 percent tellurium could yield $Pb_{1-x}Sn_xTe$ materials having carrier concentrations of $10^{16}$ carriers per cubic centimeter if the technique is capable of considerably slower growth rates.

The carrier mobilities of P-type $Pb_{1-x}Sn_xTe$ alloys ($x > 0.02$) at 77° K. have been noted to be relatively independend of $x$. The mobilities are seen to be a function of carrier concentrations in a manner similar to PbTe crystals but with lower mobilities than PbTe crystals. This has been attributed to a static dielectric constant for the $Pb_{1-x}Sn_xTe$ crystals which is independent of $x$ and is almost a factor of two lower than the static dielectric constant for PbTe.

What is claimed is:

1. The growth of bulk single crystals of $Pb_{1-x}Sn_xTe$ containing from $10^{16}$ to $10^{20}$/cm.$^3$ carrier concentrations, comprising:
   a. preparing a nonstroichiometric melt solution of Pb, Sn and 10 to 45 percent Te in a heated crucible within a sealed growth chamber,
   b. covering the surface of the melt with liquid boric oxide for increasing thermal stability and dampening any vibrations,
   c. maintaining in said growth chamber an inert gas pressure greater than the vapor pressure of the most volatile component of said melt to suppress volatilization,
   d. lowering a seed of $Pb_{1-x}Sn_xTe$ through the liquid boric oxide into contact with the surface of said melt and then slowly withdrawing the seed at constant pull rate of from 0.2 to 3 millimeters per hour.
2. The technique as in claim 1 wherein epitaxial layers of $Pb_{11x}SnTe$ crystal are grown on substrates.
3. A technique as in claim 1 wherein the boric oxide is treated for removal of any water, so as to contain less than 10 parts per million of water.
4. A technique as in claim 1 wherein $x = 0.10$.
5. A technique as in claim 1 wherein $x = 0.17$.

* * * * *